Figure 1:
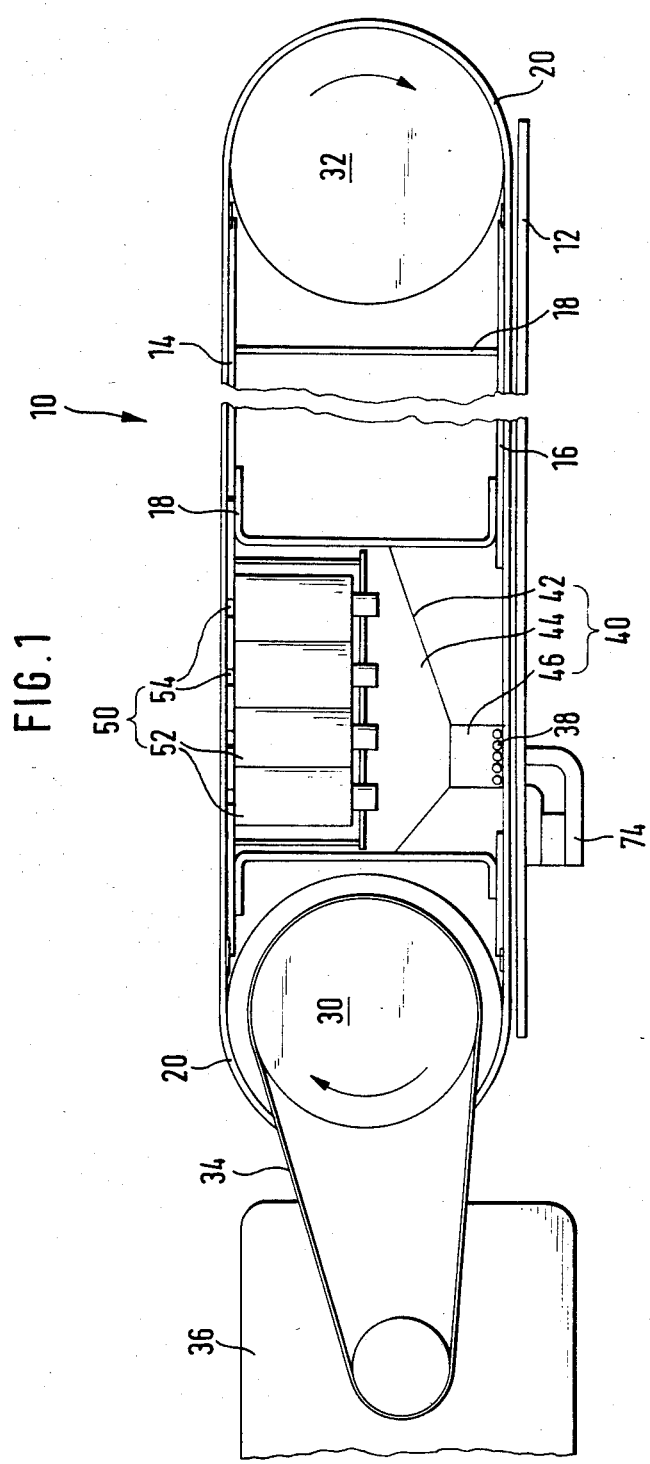

United States Patent [19]

Meinzer

[11] Patent Number: 4,551,102

[45] Date of Patent: Nov. 5, 1985

[54] METHOD AND DEVICE FOR DISPLAYING GRAPHIC INFORMATION, IN PARTICULAR FOR BRAILLE READING

[76] Inventor: Karl Meinzer, an den Brunnenröhren 21, D-3550 Marburg, Fed. Rep. of Germany

[21] Appl. No.: 602,167

[22] Filed: Apr. 19, 1984

[30] Foreign Application Priority Data

Apr. 22, 1983 [DE] Fed. Rep. of Germany ....... 3314645

[51] Int. Cl.[4] ............................................. G09B 21/00
[52] U.S. Cl. ................................... 434/114; 400/122; 273/DIG. 27
[58] Field of Search ............................... 434/113–115; 400/122; 273/DIG. 27

[56] References Cited

U.S. PATENT DOCUMENTS

| | | |
|---|---|---|
| 2,521,338 | 9/1950 | Bryce et al. .......................... 434/114 |
| 3,132,962 | 5/1964 | Seymour .............................. 434/113 |
| 3,624,772 | 11/1971 | Grunwald ............................ 434/114 |
| 3,736,672 | 6/1973 | Skewis et al. ....................... 434/114 |
| 3,740,446 | 6/1973 | Benson ................................ 434/114 |
| 4,108,066 | 8/1978 | Andersson .......................... 400/122 |
| 4,445,871 | 5/1984 | Becker ................................ 434/114 |

OTHER PUBLICATIONS

Nassimbeme, "Ball and Belt Loop Braille Line Display", IBM Technical Disclosure Bulletin, vol. 18, No. 7, pp. 2294–2295, 12/75.

*Primary Examiner*—William Pieprz
*Attorney, Agent, or Firm*—Fred Philpitt

[57] ABSTRACT

For displaying graphic information, in particular for braille reading, the invention employs small magnetizable balls (38) which are very rapidly patterned on an indented or perforated support (20) so as to partly project therefrom underneath a foil (70) holding the balls against falling out, whereupon the support is moved to a reading plane. Preferably, a lower feeding station (40) distributes balls into all perforations (22) of the support; the balls not required for the desired display are then sucked off in an upper removal station (50) by electromagnets (52) set off in an array aligned with staggered apertures in an upper plate (62). Short-time actuation of selected electromagnets is coordinated with the support motion under electronic control which may provide for time-multiplexed interleaving. A preferred embodiment includes two drums (30, 32) with sprocket wheels (28) arranged to pull a web-like endless belt band (20) with its foil (70) across frame plate (14, 16) of the device (10).

11 Claims, 8 Drawing Figures

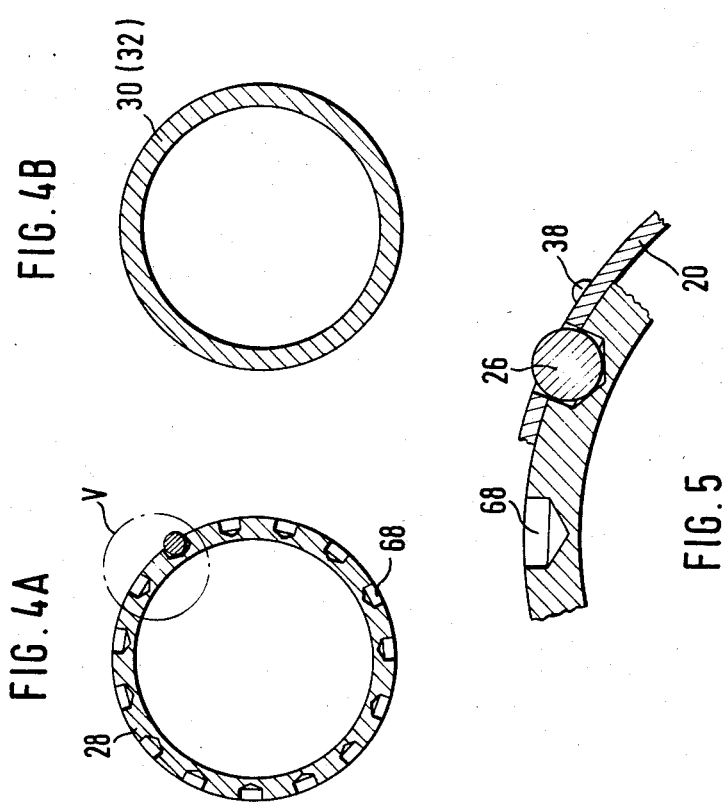
FIG. 4B
FIG. 4A
FIG. 5
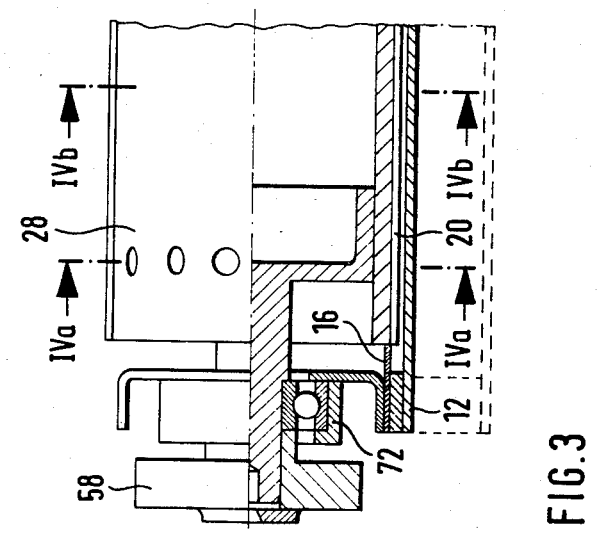
FIG. 3

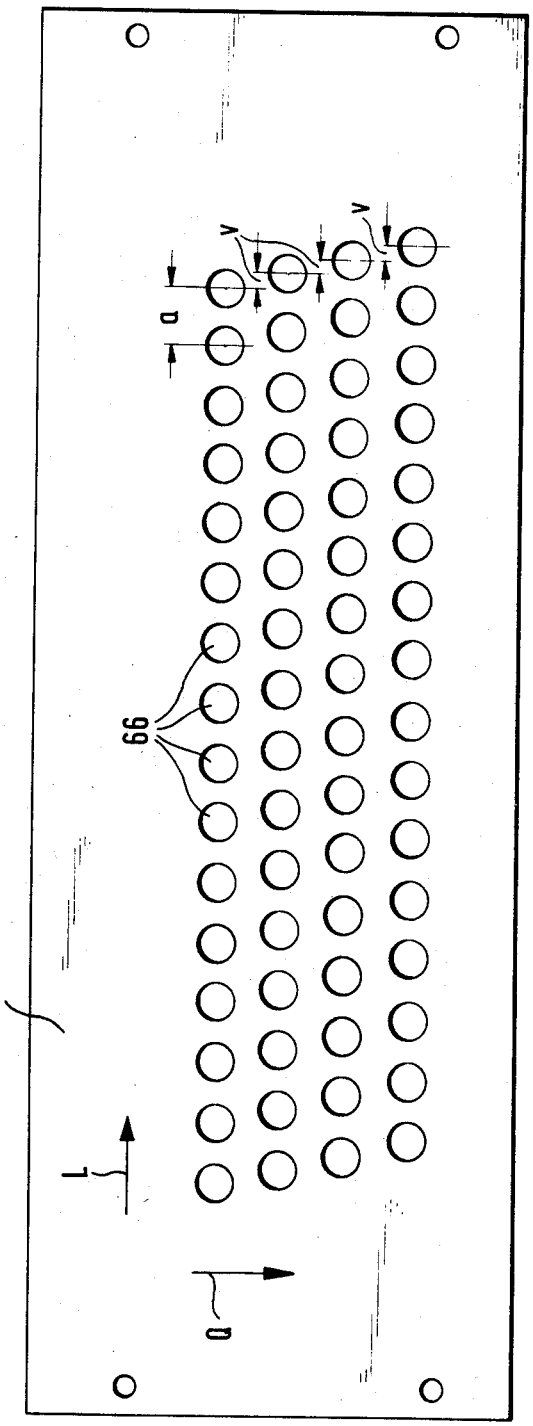

METHOD AND DEVICE FOR DISPLAYING GRAPHIC INFORMATION, IN PARTICULAR FOR BRAILLE READING

FIELD OF THE INVENTION

The invention relates to a method and a device intended primarily for displaying graphic information such that at least tactile perception is possible during arbitrary periods of time. Though not exclusively, the invention aims above all to provide such information display for the blind.

BACKGROUND OF THE INVENTION

Embossed printing or braille makes texts of all sorts accessible to the blind, mainly by way of very expensive books. However, it is difficult to convey to them reading matter that is neither typed nor printed nor even tied down to letters, books, etc. As a rule, short texts such as news, summaries or the like will reach the blind by auditory means.

Apparatuses have been developed recently for setting a line which may be sensed for braille reading. An example is disclosed by DE-OS No. 30 33 078 comprising a perforated drum and electromagnetically actuatable pins extending therethrough to form single lines which may be sensed tactually. Such devices are, however, quite expensive and hardly or not at all suitable for continuous reading in the manner almost exclusively practised by the seeing.

In U.S. Pat. No. 3,622,759, a device has been described that is intended as a part of a print-reading machine for the blind. It includes a perforated endless belt which receives pellets of cubical, spherical or other shape from a code-feeding unit and which is moved to an output unit then. There, each pellet may be engaged by a punch to lift movable members, presumably character-bearing pads to be sensed. The setting operation is tedious and prone to troubles since a rather complex mechanism must be operated in a series of steps.

In the prior art, there is thus a lack of reading means for the blind in the manner of news in brief, short information or the like, whereas wall news-sheets, bulletin boards, etc. are something unheededly normal to the remaining population.

OBJECTS OF THE INVENTION

It is an important object of the invention to provide remedy and to enable the blind to get access to such graphic information or text displays which usually are not duplicated.

Another object of the invention is to provide an uncomplicated and economical reading display for the blind in view of their social situation that often is quite critical.

A further object of the invention consists of creating an efficient method and device for fast set-up of patterns for tactile sensing.

Yet another object of the invention is the design of a simple and sturdy device capable to be operated with little effort over long periods of time.

SUMMARY OF THE INVENTION

In accordance with the invention, all the symbols required are first set at a writing place onto a support that is subsequently moved to a reading place, in a manner known per se. This procedure is much less awkward than other conventional methods which require more complicated equipment. According to the prior art, the dots of each braille symbol used for the individual words or lines were formed by elevated pins. Overcoming this technique, the invention employs small balls arranged in a desired pattern on a support such that they partly project therefrom. This patterning is effected very rapidly and reliably. The patterned support is then moved to a reading plane where the ball pattern may be directly sensed. This is an important distinction over U.S. Pat. No. 3,622,759 wherein the pellets are purely intermediate members in an elevating punch mechanism.

The symbols may be of standard size, e.g. with a distance between adjacent dots of 2.5 mm, and the number of symbols per line as well as the number of lines can, within limits, be freely selected. For example, a full text page may comprise 24 lines of 20 symbols each. Using balls with a diameter of 1.6 mm or below, the set dots of the symbols may be embossed by 0.5 mm relative to the reading plane. The symbol dots are spherically curved and are displayed even while fingers rest on them. It is impossible to press the dots down so as to make them disappear. Likewise, the equipment cannot be damaged by using it. In operation, the device is almost noiseless and vibration-free. The working position may be horizontal or inclined towards the user, e.g. by about 30 degrees.

SPECIALIZATIONS OF THE INVENTION

An important embodiment of the invention consists of setting the information to be displayed by distributing from a lower feeding station balls into all receiving perforations or indentations provided in the support which is preferably an endless belt band and is enclosed by a thin foil preventing the balls from falling out. The balls not required for the desired display are then removed in an upper removal station. As the embossed printing is formed of a uniform matrix, e.g. a 2.5 mm×2.5 mm dot screen, it is possible to display arbitrary graphic information such as mathematical curves, maps, type scripts, etc. including uncoded text. If re-setting a whole page is required for changing the information displayed, this will take only about 1 second; calculation for 24 lines yields 0.7 s. During this short period, the information cannot be read; however, it is subsequently available without limitation, even during power failures.

Preferably, the selective ball distribution is effected with the use of magnetic force. From collecting and sorting means such as a bin and a chute, magnetizable balls are advanced to a feeding station due to the action of a permanent filler magnet. The feeding station consists of immovable components and is located at the underside of the device frame, underneath an upper removal station. The latter provides for electromagnetic sucking-off of the balls not required, under electronic control. The invention also contemplates moving the patterned support only during the set-up operation and up to arrival in the reading area, in timed relation with the actuation of the electromagnets. A tensioning or tightener means may be provided for the endless belt band that is, in particular, enclosed by a thin foil flexibly engaging the ball pattern for tactile sensing therethrough while preventing the balls from falling out.

IN THE ANNEXED DRAWINGS

Figure 2:
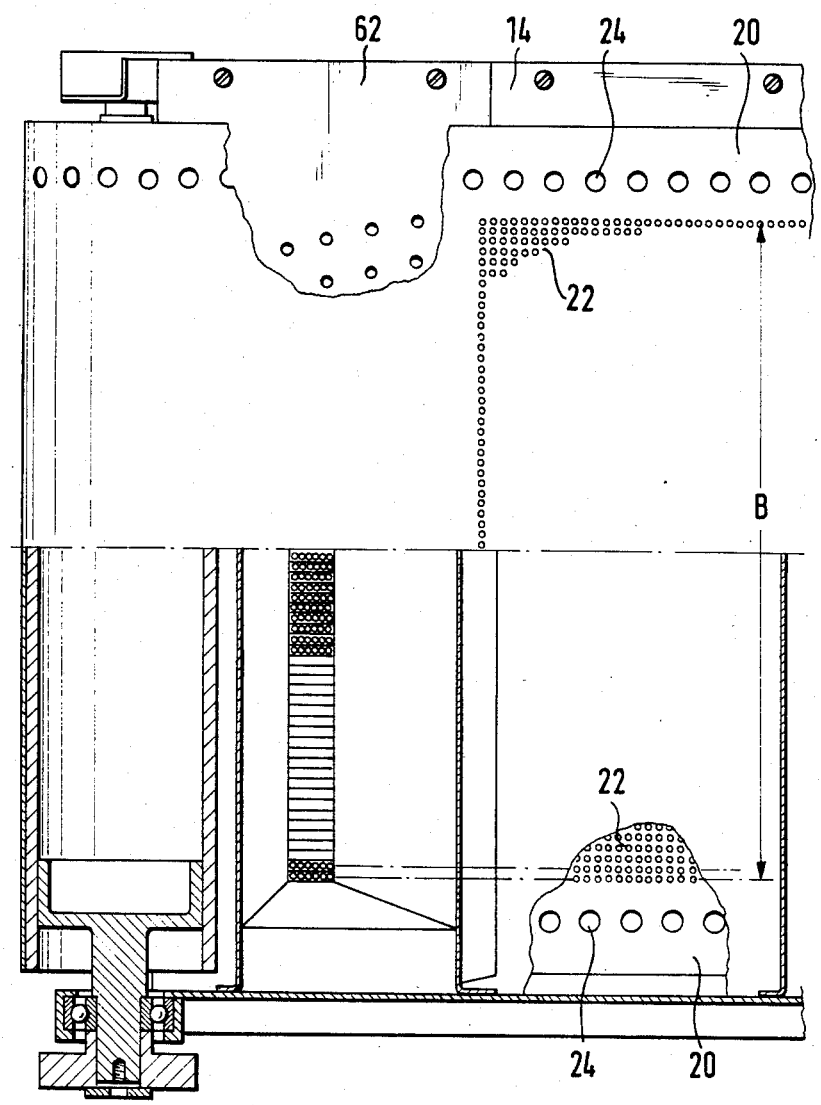
Figure 6:
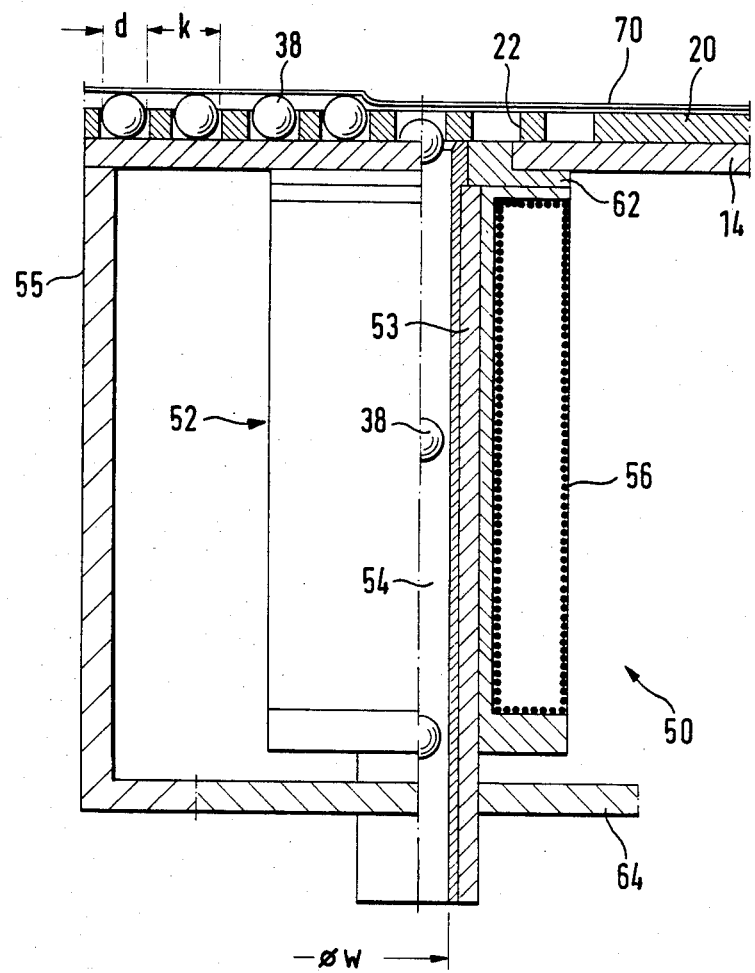

FIG. 1 is a schematic side view, partly in cross section, of a device according to the invention, FIG. 2 is a top view of part of a support in the device of FIG. 1, FIG. 3 is a part view, partly sectioned, of a drum in the device of FIG. 1, FIG. 4A and FIG. 4B are sectional views corresponding to lines IVa—IVa and IVb—IVb, respectively, of FIG. 3, FIG. 5 shows an enlarged part view of the zone marked V in FIG. 4A, FIG. 6 is an enlarged side view, partly sectioned, of a ball removal station in the device of FIG. 1 and FIG. 7 is a top view of an apertured plate in the station of FIG. 6.

DESCRIPTION

The device according to the invention is generally designated by 10 and is represented in FIG. 1 in about natural size, if somewhat shortened. It comprises a frame 12 with an upper plate 14 and a lower plate 16. Between these two, braces 18 are provided for propping. A belt band 20 that may include two or more fields of parallel perforations 22 is contiguous on top of the upper plate 14 (FIG. 2). Belt band 20 is a conveying means of tough and flexible, non-stretching material such as leather, plastics, coated fabric, etc. and is preferably enclosed by a thin foil 70 engaging the belt band at least across the perforation fields. Near either edge, belt band 20 includes engaging holes 24 into which fit sprockets 26 of wheels or tracks 28 that are attached to two drums 30, 32 or are integral therewith (FIGS. 3 to 5). As will be seen in FIG. 1, an electric motor 36, possibly a step motor, may be provided for enslaving one of these drums, e.g. 30. If desired, the drum or either drum can also be rotated by means of a hand wheel 58 (FIG. 3).

The sectional view of FIG. 4A shows the engaging wheel portion 28 of drum 30 to have radial counterbores 68 for receiving the elements of sprockets 26. In the embodiment according to FIG. 5, these are made up by balls, but cylindrical, conical and other projections (26) are suited as well. For supporting the drums 30, 32, bearings 72 are mounted to either side of frame 12 (FIG. 3).

With particular reference to FIGS. 2 and 3, it will be seen that the endless belt band 20 includes, say, two screen fields of bores serving to receive magnetizable balls 38 (FIGS. 5 and 6), i.e. which consist of magnetically permeable material. A ball feeding station 40 comprising a chute 42 with a bin 44 is provided at the lower side of frame 12. Underneath this station, sorter compartments 46 (merely indicated schematically) may be arranged for collecting and feeding the balls 38 which are, under the force of a permanent filler magnet 74, advanced into the perforations 22 of belt band 20 that is passing below in contiguous relation to lower plate 16.

As an example of dimensions, the perforations 22 or indentations in belt band 20 may have a diameter 1.7 mm which is suitable for receiving steel balls having a diameter $d \leq 1.6$ mm, and the clear width w of the coil passages 54 may expediently be chosen to be 2.0 mm. If the belt band 20 has a thickness or cheek of 1.0 mm, the ball tips will project therefrom by 0.6 mm. The balls 38 are prevented from falling out by the thin foil 70 that encloses the belt band 20 (FIG. 7) but permits sensing the balls tactually.

Under the power of the drive system, drum 30 rapidly moves belt band 20 to a ball removal station 50 arranged above the feeding station 40 (FIGS. 1 and 6). The removal station 50 includes an upper apertured plate 62 below which there are electromagnets 52 with coils 56. The cores 53 of coils 56 consist of magnetically permeable or ferromagnetic material such as iron and include a thin unmagnetic lining, e.g. of brass, providing axial passages 54 for balls 38. Belt drive 34 is set going already while a perforated portion of belt band 20 is at the removal station 50. Balls 38 will arrive there only when the full belt speed of, for example, 500 mm/s will be reached. Thus a time period of merely about 3 ms is available for moving a ball 38 across a hole 54. In this short time, the gravity fall path amounts to only about 50 $\mu$m and is, therefore, negligible.

The invention provides for selectively actuating the electromagnet 52 associated to a particular hole 54, by energizing the respective coil 56, at the moment when a ball 38 arrives so that it will be sucked off downwards with an acceleration that is about 500 to 1000 times larger than that of gravity. The ball sucked off will shoot through passages 54 without sticking to any magnetic material and will fall into bin 44 and chute 42 (FIG. 1). An outer housing 55 (FIG. 6) connecting the lower ends of coil cores 53 to upper plate 14 prevents a magnetic brake effect on the balls 38 which then return to the feeding station 40.

The upper apertured plate 62 and a lower apertured plate 64 serve to mount the electromagnets 52 (FIG. 7). Bores 66 that receive the upper and lower ends of electromagnets 52 are arranged in several parallel rows and are spaced by distances a in the longitudinal direction L. Each of these rows is staggered relative to the adjacent row by an offset dimension v which is chosen to equal the quotient of the ball spacing k in belt band 20 divided by the number of aperture rows.

In order that no counterforce impede the ball movement in the lower half of each electromagnet 52, these are actuated—preferably by control of a microprocessor (not shown)—only during part of the time period T required for moving belt band 20 in longitudinal direction L across one ball spacing k. It will suffice to energize the individual electromagnets 52 during about T/4 if (as depicted) there are four aperture rows staggered by k/4 each. To begin with, the electromagnets neighboring in direction Q are sequentially actuated. Simultaneously with the advance of belt band 20 by a quarter of a ball spacing, i.e. by k/4, the exciting voltage is applied to the next transverse row of electromagnets, commencing with the first aperture row (topmost in FIG. 7).

Owing to the short duration of the sucking-off operation, the ball set-up is sped up considerably. It is thus possible to control the electromagnets 52 according to a multiplex program yielding interleaved time gates or windows, so that one and the same electronic control means can be used sequentially for all the electromagnets. Device 10 can be controlled by an uncomplicated interface (not shown) of a low-priced computer including a software driver. Arbitrary graphic information can be displayed, in particular embossed print or braille. There is no restriction to pure texts but pictorial representations, tables, diagrams, schemata or the like may be displayed as well. In addition, clear texts, plots, etc. may be displayed for both tactile and visual perception.

Support 20 may also be a rigid plate or disk that is manufactured of metal, hard plastics or the like and is provided with perforations 22 or indentations.

Alternatively, cylindrical bores or perforations 22 in belt band 20 may be replaced by inwardly widening bores, recesses, etc. preventing the balls 38 from falling out. However, such design might enhance jamming and thus impede or delay the sucking-off of the balls in the removal station 50.

The outer dimensions of device 10 depend on the useful reading plane the size of which can be chosen arbitrarily and is preferably set to at least one text page. The upper face of device 10 is larger than the reading area by a framing margin. The overall height of device 10, which is rather flat, is defined by the drum size.

Important advantages of the invention are due to the pattern set-up by magnetizable balls 38 under magnetic field action, i.e. without moving parts. The speed of belt drive 34 and thus of support 20 during its forward motion in the feeding station 40 is coordinated with the control of solenoid actuation in the removal station 50 so that the ball set-up is brought about in a jiffy. The drive system including belt drive 34 is braked as soon as the final aperture row has been ball-filled according to the pattern programmed. The patterned support 20 will come to a standstill on the reading table (upper plate 14) and is available there without time limitation.

It is also favorable that the apparatus does not employ any substances that might exhaust or be used up. Moreover, there are no components of large temperature dependence. Power consumption is low, e.g. amounting to an average of 15 W only. It is of particular convenience that no periodic maintenance will be required, as the simple design warrants trouble-free operation; mean times between failures of the order of several thousand hours can easily be attained. Manufacture requires comparatively little time and material. If the volume of symbols to be displayed is to be increased, this will entail only minor additional cost.

While preferred embodiments have been illustrated and explained hereinabove, it should be understood that numerous variations and modifications will be apparent to one skilled in the art without departing from the principles of the invention which, therefore, is not to be construed as being limited to the specific forms described.

I claim:

1. A device for displaying patterns of small balls for braille reading purposes comprising in combination
    (a) an endless belt containing a plurality of parallel rows of perforations,
    (b) drive means to move said endless belt in a loop between two spaced apart drums,
    (c) a ball feeding station located above the lower portion of the looped endless belt, which feeding station is adapted to deposit magnetizable balls in all of the perforations in the belt as the belt passes the feeding station,
    (d) a ball removal station located beneath the upper portion of the looped endless belt, which station is adapted to selectively remove balls by electromagnetic means from certain of said perforations as the belt moves past said removal station,
    (e) a reading area downstream of said removal station wherein the balls remaining in the perforations of the belt and which have a portion of each ball partially extending above the upper level of the belt can be read by tactile sensing of the balls,
    (f) said ball removal station including a plurality of spaced apart electromagnetic means which are adapted to cause the withdrawal of selected balls from said perforations with a force greater than gravitational force, and
    (g) electronic control means for controlling the said electromagnetic means so that the selective removal of balls from the perforations of said endless belt will result in a pattern of balls that will convey information to a person in the reading area.

2. Device according to claim 1 wherein said belt is enclosed by a flexibly engaging foil that is thin enough to permit tactile sensing of the ball pattern formed.

3. Device according to claim 1 wherein the drive means comprises an electric motor as well as a belt drive connected to one of the drums and wherein the sprockets are formed by elements seated in radial counterbores of the respective drum.

4. Device according to claim 1, wherein the ball feeding station includes collecting means for the balls comprising a chute that extends across the belt width.

5. Device according to claim 1 wherein the electronic control means provides for actuation of the electromagnets during part only of the time period required for moving the support across one ball spacing path.

6. Device according to claim 1 wherein the electronic control means provides for time-multiplexed interleaving of actuation of the electromagnets, successive transverse rows of which being actuated simultaneously with the respective support motion across one ball spacing path.

7. Device according to claim 1 wherein the ball feeding station is located immediately below the ball removal station and is associated with a filler magnet to insure filling of the perforations with balls.

8. Device according to claim 7 wherein the ball removal station includes electromagnets whose coil cores have axial passages of a clear width that at least slightly exceeds the ball diameter and wherein the bottoms of the coil cores are connected to the upper plate by magnetic flux return means.

9. Device according to claim 8 wherein the ball removal station comprises two apertured plates above each other which extend substantially across the belt width between the engaging hole tracks and which have rows of parallel bores.

10. Device according to claim 9 wherein the electromagnets and the bores of the apertured plates associated thereto are set off in a staggered array, the offset dimension in one direction equalling the ball spacing in the perforations of the support.

11. A method for displaying information in the form of patterns of small balls for braille reading which comprises
    (a) establishing a plurality of parallel rows of small magnetizable balls seated in an endless conveyor belt containing a plurality of parallel rows of perforations; all of said perforations being filled with said magnetizable balls,
    (b) moving said conveyor belt to a zone for the selective removal of some of said balls,
    (c) selectively removing some of said balls from said perforations in said zone with electromagnetic means, the force of which is greater than gravitational force,
    (d) controlling said electromagnetic means so that the selective removal of balls from the conveyor belt will result in a pattern of balls, and
    (e) moving said conveyor belt to a reading area for conveying information to an unsighted person via tactile sensing of the ball pattern.

* * * * *